(12) United States Patent
Zhang

(10) Patent No.: US 10,776,087 B2
(45) Date of Patent: Sep. 15, 2020

(54) SEQUENCE OPTIMIZATIONS IN A HIGH-PERFORMANCE COMPUTING ENVIRONMENT

(71) Applicant: INTEL CORPORATION, Santa Clara, CA (US)

(72) Inventor: Yongzhi Zhang, Wayland, MA (US)

(73) Assignee: INTEL CORPORATION, Santa Clara, CA (US)

( * ) Notice: Subject to any disclaimer, the term of this patent is extended or adjusted under 35 U.S.C. 154(b) by 165 days.

(21) Appl. No.: 16/017,000

(22) Filed: Jun. 25, 2018

(65) Prior Publication Data

US 2019/0042218 A1 Feb. 7, 2019

(51) Int. Cl.
*G06F 8/41* (2018.01)
*G06F 8/30* (2018.01)

(52) U.S. Cl.
CPC ............ *G06F 8/433* (2013.01); *G06F 8/31* (2013.01); *G06F 8/44* (2013.01); *G06F 8/443* (2013.01); *G06F 8/4432* (2013.01)

(58) Field of Classification Search
None
See application file for complete search history.

(56) References Cited

U.S. PATENT DOCUMENTS

| | | | | |
|---|---|---|---|---|
| 5,327,561 A * | 7/1994 | Choi | ............ | G06F 8/433 717/144 |
| 6,286,135 B1 * | 9/2001 | Santhanam | ............ | G06F 8/443 717/146 |
| 6,738,967 B1 * | 5/2004 | Radigan | ............ | G06F 8/47 717/146 |
| 7,278,137 B1 * | 10/2007 | Fuhler | ............ | G06F 8/4434 717/151 |
| 7,370,321 B2 * | 5/2008 | Radigan | ............ | G06F 8/433 717/144 |
| 7,707,568 B2 * | 4/2010 | Kawahito | ............ | G06F 8/4434 717/159 |
| 2004/0163053 A1 * | 8/2004 | Snider | ............ | G06F 30/30 716/103 |
| 2005/0268293 A1 * | 12/2005 | Kawahito | ............ | G06F 8/4434 717/154 |
| 2006/0059119 A1 * | 3/2006 | Canright | ............ | G06F 16/951 |
| 2008/0028380 A1 * | 1/2008 | Guo | ............ | G06F 8/433 717/151 |

(Continued)

OTHER PUBLICATIONS

Singer: "Static Single Assignment Book Wednesday 30th", May 30, 2018 (May 30, 2018), XP055640275, Retrieved from the Internet: URL:http://ssabook.gforge.inria.fr/latest/book.pdf.

(Continued)

*Primary Examiner* — Isaac T Tecklu

(57) ABSTRACT

Embodiments are directed to techniques to determine dataflow graph instructions comprising one or more pick/switch instruction pairs and generate a reverse static single assignment graph based on the dataflow graph instructions, the reverse static single assignment graph comprising strongly connected components, each of the strongly connected components associated with at least one of the one or more pick/switch instruction pairs. Embodiments also include traversing the reverse static single assignment graph depth-first, and replace pick/switch instructions associated with strongly connected components having configuration values with compound instructions.

25 Claims, 8 Drawing Sheets

(56) References Cited

U.S. PATENT DOCUMENTS

| | | | |
|---|---|---|---|
| 2012/0254845 A1* | 10/2012 | Yi | G06F 8/45 |
| | | | 717/144 |
| 2014/0053129 A1* | 2/2014 | Von Platen | G06F 9/4494 |
| | | | 717/110 |
| 2015/0106596 A1* | 4/2015 | Vorbach | G06F 9/3001 |
| | | | 712/221 |
| 2016/0062751 A1* | 3/2016 | Oprea | G06F 8/4441 |
| | | | 717/152 |
| 2016/0299998 A1* | 10/2016 | Isshiki | G06F 30/327 |
| 2019/0004955 A1* | 1/2019 | Adler | H03K 19/17736 |
| 2019/0004994 A1* | 1/2019 | Fleming | G06F 15/80 |
| 2019/0042513 A1* | 2/2019 | Fleming, Jr. | G06F 15/7867 |
| 2019/0102151 A1* | 4/2019 | Zhang | G06F 8/433 |
| 2019/0102179 A1* | 4/2019 | Fleming | G06F 9/5016 |
| 2019/0303168 A1* | 10/2019 | Fleming, Jr. | G06F 9/3897 |

OTHER PUBLICATIONS

European Search Report and Written Opinion for the European Patent Application No. EP19175739, dated Nov. 18, 2019, 6 pages.

* cited by examiner

100

*Source Code 252*

```
For (i=0; i<n; i++)
{
    a[i] = b[i];
}
```

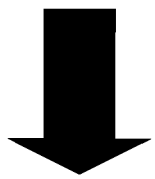

*Control-Flow Code 254*

```
CFG Code:
BB#3: derived from LLVM BB %for.body
    Predecessors according to CFG: BB#1 BB#3
        %vreg0<def> = PHI %vreg6, <BB#1>, %vreg5, <BB#3>; I64:%vreg0,%vreg5 RI64:%vreg6
        %vreg1<def> = PHI %vreg8, <BB#1>, %vreg4, <BB#3>; I64:%vreg1,%vreg4 RI64:%vreg8
        %vreg2<def> = PHI %vreg7, <BB#1>, %vreg3, <BB#3>; I64:%vreg2,%vreg3 RI64:%vreg7
        %vreg5<def> = ADD64 %vreg0, -1; I64:%vreg5,%vreg0
        %vreg10<def> = CMPNE64 %vreg5, 0; I1:%vreg10 I64:%vreg5
        %vreg3<def> = ADD64 %vreg2, 8; I64:%vreg3,%vreg2
        %vreg4<def> = ADD64 %vreg1, 8; I64:%vreg4,%vreg1
        %vreg11<def>, %IGN<def> = LD64 %vreg1, 3, %IGN; mem:LD8[%lsr.iv7](tbaa=!3) I64:%vreg11,%vreg1
        %IGN<def> = ST64 %vreg2, %vreg11, 3, %IGN; mem:ST8[%lsr.iv](tbaa=!3) I64:%vreg2,%vreg11
        BT %vreg10<kill>, <BB#3>; I1:%vreg10
        BR <BB#4>
```

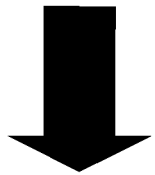

*Dataflow Code 256*

```
Data Flow Code:
    %CI1_0<def> = INIT1 0
    %CI64_6<def> = PICK64 %CI1_0, %CI64_3, %CI64_7
    %CI64_8<def> = PICK64 %CI1_0, %CI64_4, %CI64_9
    %CI64_10<def> = PICK64 %CI1_0, %CI64_5, %CI64_11
    %CI64_12<def> = ADD64 %CI64_6, -1
    %CI1_8<def> = CMPNE64 %CI64_12, 0
    %CI64_13<def> = ADD64 %CI64_10, 8
    %CI64_14<def> = ADD64 %CI64_8, 8
    %CI64_15<def>, %CI1_9<def> = LD64 %CI64_8, 3, %CI1_12; mem:LD8[%lsr.iv7](tbaa=!3)
    %CI1_11<def> = ST64 %CI64_10, %CI64_15, 3, %CI1_12; mem:ST8[%lsr.iv](tbaa=!3)
    %CI1_7<def>, %IGN<def> = SWITCH1 %CI1_8, %CI1_9
    %CI1_10<def>, %IGN<def> = SWITCH1 %CI1_8, %CI1_11
    %IGN<def>, %CI64_7<def> = SWITCH64 %CI1_8, %CI64_12
    %IGN<def>, %CI64_9<def> = SWITCH64 %CI1_8, %CI64_14
    %IGN<def>, %CI64_11<def> = SWITCH64 %CI1_8, %CI64_13
    %CI1_0<def> = MOV1 %CI1_8
```

```
%vreg68<def>, %vreg89<def>, %vreg87<def>, %vreg88<def> = SEQOTNE64 %vreg59, 0, -1;
%vreg84<def> = NOT1 %vreg88; Cl1:%vreg84,%vreg88
%vreg91<def> = MUL64 %vreg59, 8; Cl64:%vreg91,%vreg59
%vreg90<def> = ADD64 %vreg91, %vreg61; Cl64:%vreg90,%vreg91,%vreg61
%vreg70<def>, %vreg94<def>, %vreg92<def>, %vreg93<def> = SEQOTLTS64 %vreg61, %vreg90, 8;
%vreg96<def> = MUL64 %vreg59, 8; Cl64:%vreg96,%vreg59
%vreg95<def> = ADD64 %vreg96, %vreg62; Cl64:%vreg95,%vreg96,%vreg62
%vreg72<def>, %vreg99<def>, %vreg97<def>, %vreg98<def> = SEQOTLTS64 %vreg62, %vreg95, 8;
%vreg79<def>, %vreg80<def> = LD64 %vreg72, 3, %vreg81;
%vreg82<def> = ST64 %vreg70, %vreg79, 3, %vreg74;
```

```
%vreg68<def>, %vreg87<def>, %IGN<def>, %vreg88<def> = SEQOTNE64 %vreg59, 0, -1;
%vreg70<def> = STRIDE64 %vreg87, %vreg61, 8; Cl64:%vreg70,%vreg61 Cl1:%vreg87
%vreg72<def> = STRIDE64 %vreg87, %vreg62, 8; Cl64:%vreg72,%vreg62 Cl1:%vreg87
%vreg79<def>, %vreg80<def> = LD64 %vreg72, 3, %vreg81;
%vreg82<def> = ST64 %vreg70, %vreg79, 3, %vreg74; mem:STS[%dst.addr.04](tbaa=!3)
```

```
┌─────────────────────────────────────────────┐
│  DETERMINE DATAFLOW GRAPH INSTRUCTIONS HAVING │
│    ONE OR MORE PICK/SWITCH INSTRUCTION PAIRS  │
│                     405                       │
└─────────────────────────────────────────────┘
                       │
┌─────────────────────────────────────────────┐
│                                               │
│   GENERATE A REVERSE STATIC SINGLE ASSIGNMENT │
│   GRAPH BASED ON THE DATAFLOW GRAPH           │
│   INSTRUCTIONS                                │
│                     410                       │
│                                               │
└─────────────────────────────────────────────┘
                       │
┌─────────────────────────────────────────────┐
│  TRAVERSE THE REVERSE STATIC SINGLE ASSIGNMENT│
│   GRAPH DEPTH-FIRST, AND REPLACE PICK/SWITCH  │
│ INSTRUCTIONS ASSOCIATED WITH STRONGLY CONNECTED│
│  COMPONENTS HAVING CONFIGURATION VALUES WITH  │
│               COMPOUND INSTRUCTIONS           │
│                     415                       │
└─────────────────────────────────────────────┘
```

*FIG. 4*

SEQUENCE OPTIMIZATIONS IN A HIGH-PERFORMANCE COMPUTING ENVIRONMENT

GOVERNMENT LICENSE RIGHTS

This invention was made with government support under H98230-13-D-0124 awarded by Department of Energy. The government has certain rights in the invention.

TECHNICAL FIELD

Embodiments described herein include techniques to perform sequence optimizations for configurable spatial accelerators in a high-performance computing environment.

BACKGROUND

Exascale systems are projected to integrate on the order of 100,000 processor nodes to achieve enormous processing goals, as defined by the Department of Energy, of 1 ExaFLOPs within an aggressive power budget (20 MW). However, simultaneously improving the performance and energy efficiency of program execution with classical von Neumann architectures has become difficult and incur high energy cost. To achieve performance and energy requirements simultaneously, a new kind of architecture is required which targets high performance computing (HPC).

BRIEF DESCRIPTION OF THE DRAWINGS

FIG. 2B illustrates an example of a processing flow to convert a code segment.
FIG. 3C/D illustrate examples of code snippets.
FIG. 4 illustrates an example of a logic flow diagram.

DETAILED DESCRIPTION

Figure 1:
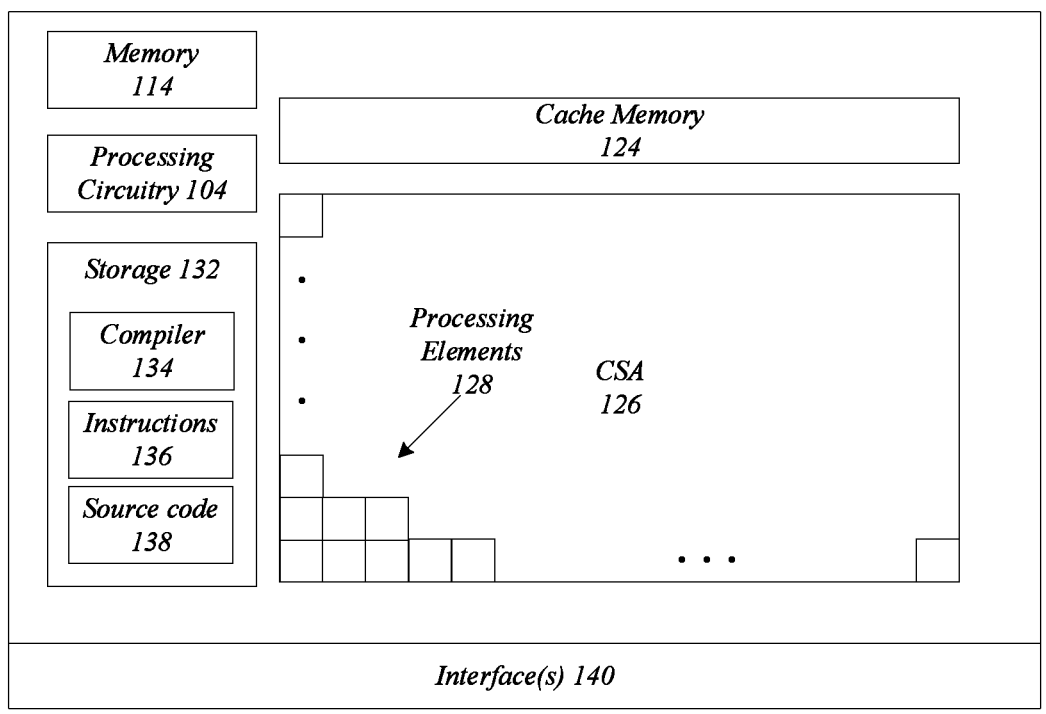
FIG. 1 illustrates an example of a computing device.

Embodiments may be directed to processing data in an HPC environment utilizing a Configurable Spatial Accelerator (CSA) architecture. The CSA executes hybrid dataflow graphs and dataflow graph instructions. Moreover, the CSA architecture enables a computationally dense yet energy-efficient spatial architecture to solve complex problems in accordance with stringent resource requirements, such as those defined by the Department of Energy's Exascale performance guidelines.

For complex operations that are common in the HPC code, the CSA captures them directly in the instruction set architecture (ISA). One important style of dataflow operator is the sequencer, which is intended to implement the control of for-style loops in an efficient manner. However, the sequencer implemented using primitive operators introduces a feedback path between the condition and post-condition update portions of the loop since these terms are often dependent (i.e. i<N is often followed by i++ or similar). This serious bottleneck in performance of the primitive implementation can be resolved by introducing the compound sequencer operation, which is able to perform the condition and update of many common for-loop patterns in a single operation. Examples of such compound instructions are, sequence, sequence reduction (which need to be correlated to the sequence instruction it depends on), repeat (a data flow idiosyncrasy generated in the data flow conversion pass for loop invariant variable), sequence stride (driven by a sequence instruction), nestrepeat (driven by two sequence instruction), filter, replace, replicate, etc. Embodiments discussed herein are focused on efficiently generating those compound data flow instructions Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a computing device 100 in which aspects of the present disclosure may be employed to process data in a high-performance computing environment. In embodiments, the computing device 100 includes a configurable spatial accelerator (CSA) 126 having an accelerator architecture design to execute hybrid dataflow graphs and dataflow graph instructions. An accelerator architecture enables a computationally dense yet energy-efficient spatial architecture to solve complex problems in accordance with stringent resource requirements, such as those defined by the Department of Energy's Exascale performance guidelines.

In embodiments, the computing device 100 may include a number of components including the CSA 126 having an array of processing elements (PEs) 128 coupled by an interconnect, e.g., back-pressured network or fabric. The PEs 128 are heterogeneous and may be customized to perform highly efficient operations. For example, each of the PEs 128 may perform a specific function, such as integer arithmetic, floating point arithmetic, communication, in-fabric storage, and so forth.

The computing device 100 including the PEs 128 may process dataflow graphs and dataflow graph instructions, which are parallel program descriptions arising in the compilation of sequential codes. These graphs are directly configured on to the PEs 128, rather than being transformed into sequential instruction streams. The derivation of graphs from traditional sequential compilation flows allows the computing device 100 to support familiar programming models, e.g., C, C++, Fortran, etc., and to directly execute existing high-performance computing instructions.

In embodiments, the computing device 100 may include cache memory 124 that may be utilized by the PEs 128 to process the dataflow graphs and instructions. In some embodiments, the cache memory 124 may be coupled with the PEs 128 via an Accelerator Cache Interconnect (ACI) that includes a network connecting request address file (RAF) circuitry to the cache memory 124. In embodiments, the CSA 126 may also include an in-fabric memory (not shown), such as a buffer PE (a small storage element) and memory element (a larger storage element). In embodiments, the buffer element may provide a small amount of memory to improve performance in the presence of variable-latency subgraphs. Each buffer element will provide several buffers which can either be used individually or grouped to form a larger structure. The memory element is typically a larger memory, such as an SRAM-based structure can be tied our coupled with the cache memory 124 using a mezzanine network. The memory element may be used to storage capacity in service of the runtime system within the fabric, for example, to cache dataflow graph configurations. Embodiments are not limited in this manner.

In embodiments, the computing device 100 may include one or more components to perform compilation and optimization operations to compile the source code, such as C, C++, Fortran, etc. into compiled dataflow graphs that may be overlaid onto the fabric and PEs 128 for execution. For example, the computing device 100 may include processing circuitry 104 that may be used to perform one or more operations discussed herein, e.g., compile source code, perform optimizations, overlay (assign) dataflow graphs, and so forth. The processing circuitry 104 may be any type of processing circuitry include a processing core or processing unit, a central processing unit, a controller, and so forth. In some embodiments, the processing circuitry 104 may be located on the same die as the other components of the computing device 100. However, in other embodiments, the processing circuitry 104 may be located on a different die, but on the same board as the components of the computing device 100. In even different embodiments, the processing circuitry 104 may be part of a different computing device and communicate with the components of the computing device 100 via interface 140. Embodiments are not limited in this manner.

In embodiments, the computing device 100 includes memory 114 and storage 132. The memory 114 may be one or more of volatile memory including random access memory (RAM) dynamic RAM (DRAM), static RAM (SRAM), double data rate synchronous dynamic RAM (DDR SDRAM), SDRAM, DDR1 SDRAM, DDR2 SDRAM, SSD3 SDRAM, single data rate SDRAM (SDR SDRAM), DDR3, DDR4, and so forth. Embodiments are not limited in this manner, and other memory types may be contemplated and be consistent with embodiments discussed herein. In embodiments, the memory 114 may store, in some instances on a temporary basis, information and data including instructions used by the processing circuitry 104 to process.

The storage 132 may be any type of storage as discussed herein, such as a non-volatile storage. The storage 132 may store a compiler 134, one or more instructions 136, and source code 138. The compiler 134 includes a program or set of programs to translate source text/code 138 into code/text including dataflow graph instructions and graphs that may be mapped to the PEs 128. In some instances, the compilation of source code 138 with the compiler 134 can be done in multiple phases and passes to transform hi-level programming language code into, assembly language code, dataflow graphs, and perform sequence optimizations.

In embodiments, the compiler 134 compiles high-level languages such as C, C++, and Fortran into a combination of host code LLVM intermediate representation (IR) for specific regions to be accelerated. Moreover, compiler 134 may utilize the LLVM IR as input, perform optimizations and compiles the IR into a CSA assembly code. The compiler 134 converts the control-flow instructions into dataflow graph instructions or instructions for the CSA 126.

More specifically, compiler 134 may convert a function represented in control flow form, i.e., a control-flow graph (CFG) with sequential machine instructions operating on virtual registers, into a dataflow function that is conceptually a graph of dataflow operations (instructions) connected by latency-insensitive channels (LICs). In the third step, the compiler 134 generates instructions in a CSA assembly format, e.g., dataflow graph instructions. The compiler 134 may place and route the dataflow instructions on the actual CSA 126.

In some instances, the compiler 134 may perform one or more optimizations, such as a sequence optimization. For example, the compiler 134 may perform optimization operations for functions, such as loops because values such as a loop induction variable are flowing in pick/add/compare/switch cycles around the loop that can potentially be optimized using sequence units or compound instructions. The compound instruction are instructions capable of producing new sequence values at a rate of 1 per cycle, e.g., can update values of a for-loop instruction set in a single operation. The compiler 134 may run an optimization pass after the dataflow conversation to replace certain pick/switch instruction sets (cycles) with the compound instructions in assembly.

In embodiments, the compiler 134 may search for these pick/switch instruction sets, as will be discussed in more detail, and replace certain pick/switch instruction sets with a compound instruction, such as a sequence instruction, a sequence reduction instruction, a repeat instruction, a sequence stride instruction, a nestrepeat instruction, a filter instruction, a replace instruction, a replicate instruction, and so forth. In one example, a sequence instruction takes as input a triple of base, bound, and stride, and produces a stream of values roughly equivalent to a for loop using those inputs. For example, if base is 10, bound is 15, and stride is 2, then sequence instruction (seqlts32) produces a stream of three output values, 10, 12, 14. The sequence instruction also produces a control stream of 1, 1, 1, 0, which can be used to control other types of instructions in the sequence family. In another example, a sequence stride or stride instruction takes as input a base, stride, and input control (ctl), and generates a corresponding linear sequence to match ctl. For example, for a stride32 instruction, if base is 10, stride is 1, and ctl is 1, 1, 1, 0, then the output is 10, 11, 12. A stride instruction can be thought as a dependent sequence instruction which relies on a control stream of a sequence instruction when to step instead of doing a comparison bound. In another example, the reduction instruction takes as inputs an initial value init, a value stream in, and control stream ctl, and outputs the sum of the initial value and value stream. For example, a redadd32 instruction with init of 10, as of 3, 4, 2, and ctl of 1, 1, 1, 0 produces an output of 19. In another example, the repeat instruction takes as input value according to an input control stream. For example, a repeat32 instruction with input values 432 and control stream 1, 1, 1, 0 will output three instances of 42. In a final example, the onend instruction conceptually matches up input values on an input stream in to signals on a control stream ctl, returning a signal when all matches are done. For example, an onend instruction with ctl input 1, 1, 1, 0, will match any three inputs on a value stream in, and output a done signal when it reaches 0 in ctl. Embodiments are not limited to these examples.

In one specific example for a loop instruction, all the iteration constructs in the loop are detected, and a compound instruction is generated for each of them. As a result, each sequence runs independently of other sequences. For example, in a memory copy loop: for (i=0; i<n; i++) a[i]=b[i], three sequences are generated. The compiler 134 generates a first compound instruction for the induction variable i. The compiler also generates a second compound instruction for load address of array b, and a third compound instruction for store address of array a.

The compiler 134 may run the optimization operations after the compiler 134 converts the control flow to dataflow to search for sequence candidates, e.g., pick/switch pairs, to replace with compound instructions. In one example, the compiler 134 may search for pick/switch pairs that correspond to values that increase/decrease per loop iteration, e.g., an indication variable, and convert the value to a sequence instruction. The compiler 134 may also search for remaining compatible candidates, e.g., pick/switch pairs, and into compound instructions, such as dependent stride, repeat, or reduction instructions.

In embodiments, the compiler 134 may perform the optimization operations to replace the sequence candidates with the compound instructions by processing dataflow graph instructions. More specifically, the compiler 134 may determine dataflow graph instructions including one or more pick/switch instruction sets to convert to one or more compound instructions. For example, the compiler 134 may convert the control flow graph instructions to the dataflow graph instructions and determine to perform on the optimization operations on the dataflow graph instructions.

As previously mentioned, the compiler 134 may utilize pick/switch instruction pairs to replace loop instructions when converting from control flow graph instructions to the dataflow graph instructions. The compiler 134 may then search the dataflow graph instructions for the pick/switch instruction pairs to find candidates to replace with compound instructions. The dataflow graph instructions may be in single static assignment (SSA) form, which is a property of the intermediate representation (IR), e.g., IR requires that each variable is assigned exactly once, and every variable is defined before it is used. In SSA form, use-def chains are explicit and each contains a single element. Existing variables in the original IR are split into versions, new variables typically indicated by the original name with a subscript, so that every definition gets its own version. To search for the candidates, the compiler 134 generates a reverse SSA graph based on the dataflow graph instructions by reversing the edges of the dataflow control graph.

The compiler 134 may generate a reverse SSA graph including strongly connected components (SCCs) by reversing direction (flow) of the edges of the dataflow graph, which is in SSA form. In embodiments, the iteration constructs in the loop can be illustrated as SCCs in the reverse SSA. In embodiments, an SCC may be where every node is reachable from every other node in the reverse SSA graph by via edges. Moreover, each of the SCCs in the reverse SSA may be associated with a pick/switch instruction pair. The compiler 134 may traverse the reverse SSA graph depth-first to search for SCCs associated with pick/switch instruction pairs using a depth-first algorithm, e.g., Tarjan's depth-first search algorithm that is used to find the SSCs of a reverse SSA in linear time. Other algorithms may be utilized, such as Kosaraju's algorithm and the path-based strong component algorithm. Embodiments are not limited in this manner. The reversed SSA graph enables the fast linear depth-first algorithm to search quickly in linear time through the code to first identify a pick/switch instructions pair (SCC_0) associated with an induction variable and then instructions (SCC_i) having dependencies on the induction variable. A graph can have lots of tangled SCCs. Moreover, embodiments discussed enable the compiler to identify the candidate of sequence instruction by identifying SCC in graph in an order according to our specific criteria in linear time, e.g., induction variable first.

Moreover, the idea is to find the SCC_0 for loop induction variable first, generate sequence compound instruction I_0 for it. Then come the SCC_i that had data dependence on the induction variable's SCC. When generating the sequence compound instruction for SCC_i, the system requires the output of I_0, hence the order is critical.

The compiler 134 may determine an SCC associated with a pick/switch instruction pair in the reverse SSA, and determine whether the SCC and pick/switch instruction pair includes configuration values. If the pick/switch instruction pair includes configuration values, the compiler 134 may replace the pick/switch instruction with a compound instruction in the dataflow graph instructions. The configuration values for the pick/switch instruction may be based on values specified in the reverse SSA (dataflow graph instructions) and associated SCC. In one example, the compiler 134 may determine an SCC associated with a pick/switch instruction pair for an induction variable includes configuration values, such as an initial value, a boundary value, and a stride. The compiler 134 may replace the pick/switch instruction pair associated with the induction variable with a compound instruction, such as a sequence instruction. In embodiments, the compiler 134 may analyze the SCC associated with induction variable first based on the depth-first traversal. The compiler 134 may continue to analyze the reverse SSA and determine for each SCC whether configuration values are present. If the configuration values are present, the compiler 134 may replace the pick/switch pair associated with the SCC with a compound instruction. If the configuration values are not present, the compiler 134 may continue to traverse the remainder of the reverse SSA. In one example, a copy instruction loop may include SCCs associated with an address that includes configuration values including an initial value, and a stride. The compiler 134 may also replace pick/switch instructions associated with the address with one or more compound instructions.

In some embodiments, the compiler 134 may determine whether the induction variable and corresponding pick/switch instruction pair is affine or not affine, e.g., has or does not have a linear relationship between input and output. In some embodiments, the compiler 134 may determine the induction variable is affine and generate multiple compound instructions to replace pick/switch pairs, e.g., three compound instructions may replace pick/switch pairs for a copy loop instruction block. The compiler 134 may determine that the induction variable is not affine and replace the pick/switch pairs with a single compound instruction to drive the sequence processing, e.g., drives a sequence reduction the summary and sequence stride for a memory address for a copy loop instruction. Embodiments are not limited to these examples.

Figure 2A:
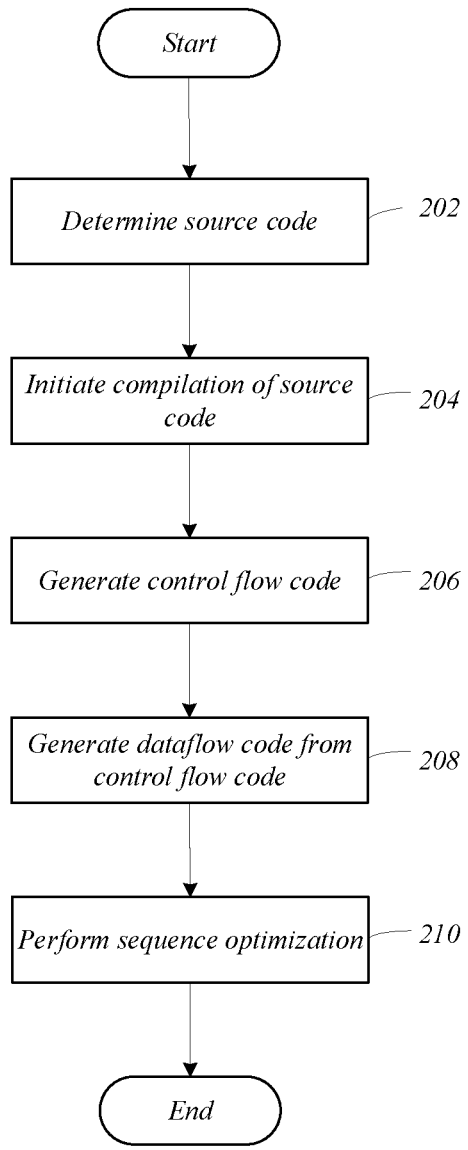
FIG. 2A illustrates an example of a logic flow.

FIG. 2A illustrates an example of a processing flow 200 that may be representative of some or all the operations executed by one or more embodiments described herein. For example, the processing flow 200 may illustrate operations performed by and one or more components of computing device 100, e.g., compiler 134. However, embodiments are not limited in this manner, and one or more other components may perform operations to enable and support the operations discussed in this processing flow 200.

At block 202, the computing device may determine source code to be compiled and for execution. As previously mentioned, the source code may be written in a high-level programming language, such as C, C++, FORTRAN, etc. and compiled, in a number of steps, by the compiler into dataflow graph instructions to be processed on the computing device. At block 204, the computing device may initiate compiling of the source code. The compiler may process the source code and generate an intermediate representation (IR)

from the high-level source code for specific regions of the computing device. In some embodiments, the source code may be converted into the IR form on a different computing device, and provided to the compiler for the CSA-specific compilation.

In embodiments, the computing device may generate control-flow instructions based on the IR at block 206. The compiler may also convert the control-flow instructions to dataflow graph instructions at block 208. For example, the compiler may take the IR as an input, optimize and compile the IR into control-flow graph instructions and then convert the control-flow graph instructions into computing device (CSA) specific assembly instructions, e.g., dataflow graph instructions. The compiler also adds appropriate buffering and latency-insensitive channels for performance.

At block 210, the computing device including the compiler may perform one or more optimizations including a sequence optimization process on the dataflow graph instructions. As previously discussed, certain code constructs, such as loops, are not optimal as a result of the control-flow instructions to dataflow graph instructions conversion because values such as the loop induction variable are flowing in pick/add/compare/switch cycles around the loop. In the CSA architecture, these kinds of cycles can be optimized using sequence units or compound instructions. To utilize compound instructions, the compiler runs an optimization pass after dataflow conversion to replace certain pick/switch cycles with compound instructions in the dataflow graph instructions (assembly), as will be discussed in more detail with respect to FIGS. 3A/3B. The compiler may perform one or more optimizations and place and route the dataflow graph instructions on the hardware fabric.

FIG. 2B illustrates code snippet examples during a processing flow to convert source code to dataflow graph instructions (prior to optimization), as discussed in FIG. 2A. Note that FIG. 2B illustrates one example based on a for loop to copy locations; however, embodiments are not limited in this manner and operations discussed herein may apply to different loop and control-flow situations.

In embodiments, a computing device including a compiler may convert high-level code, such as source code snippet 252, into IR and then control-flow graph instructions during compiler operations. The ability to process and convert the high-level code facilitates customer adoption because it does not require a customer to rewrite/convert older code and/or learn different programming languages. The control-flow graph instruction snippet 254 may be generated by the compiler based on the loop code 252. The control-flow graph instructions may include a number of different types of control-flow code, e.g., straight-line code, branching code, and loop code, that may be converted to dataflow graph instructions. Embodiments are not limited to this example, and different control-flow code may be generated for different source code.

The control-flow graph instruction snippet 254 may be converted to the dataflow graph instruction snippets 256. As illustrated in FIG. 2B, the dataflow graph instructions snippet 256 includes a number of pick/switch pairs based on the control-flow snippet 254 for the loop instruction. One or more of these pick/switch pairs may be replaced with compound instructions.

Figure 3A:
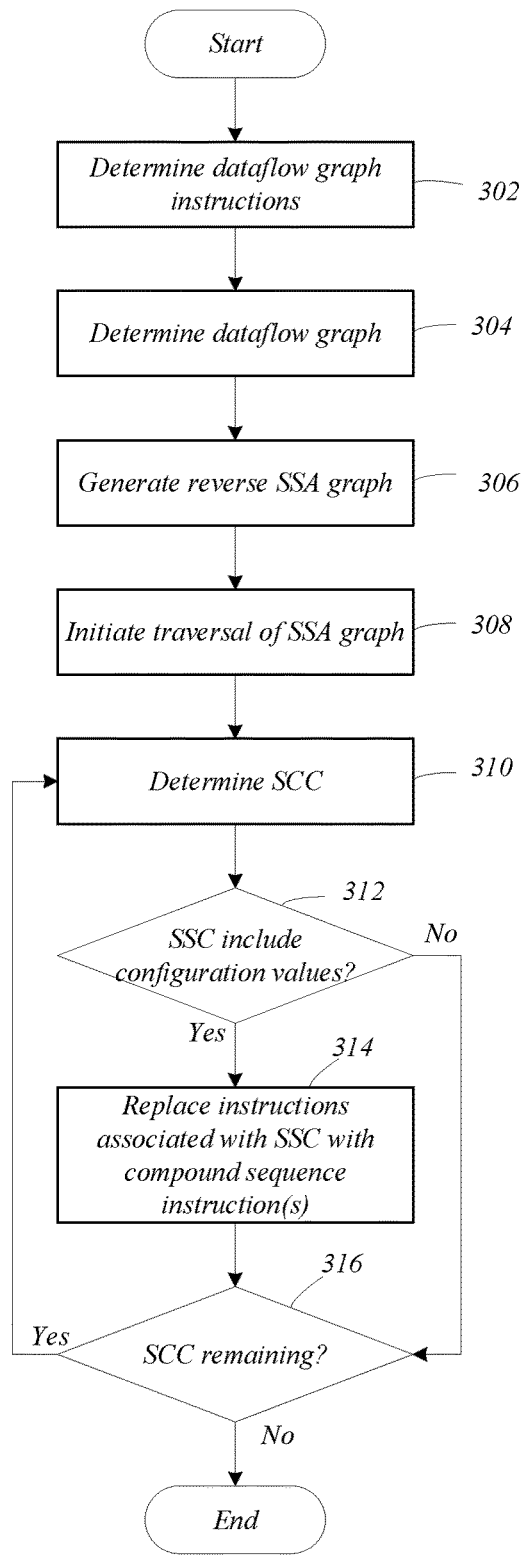
FIG. 3A illustrates an example of a second logic flow.

FIG. 3A illustrates one exemplary processing flow 300 to perform optimization operations on the dataflow graph instructions including converting/replacing one or more pick/switch pairs. The processing flow 300 may illustrate operations performed by one or more components of computing device 100, e.g., compiler 134. However, embodiments are not limited in this manner, and one or more other components may perform operations to enable and support the operations discussed in this processing flow 300.

Figure 3B:
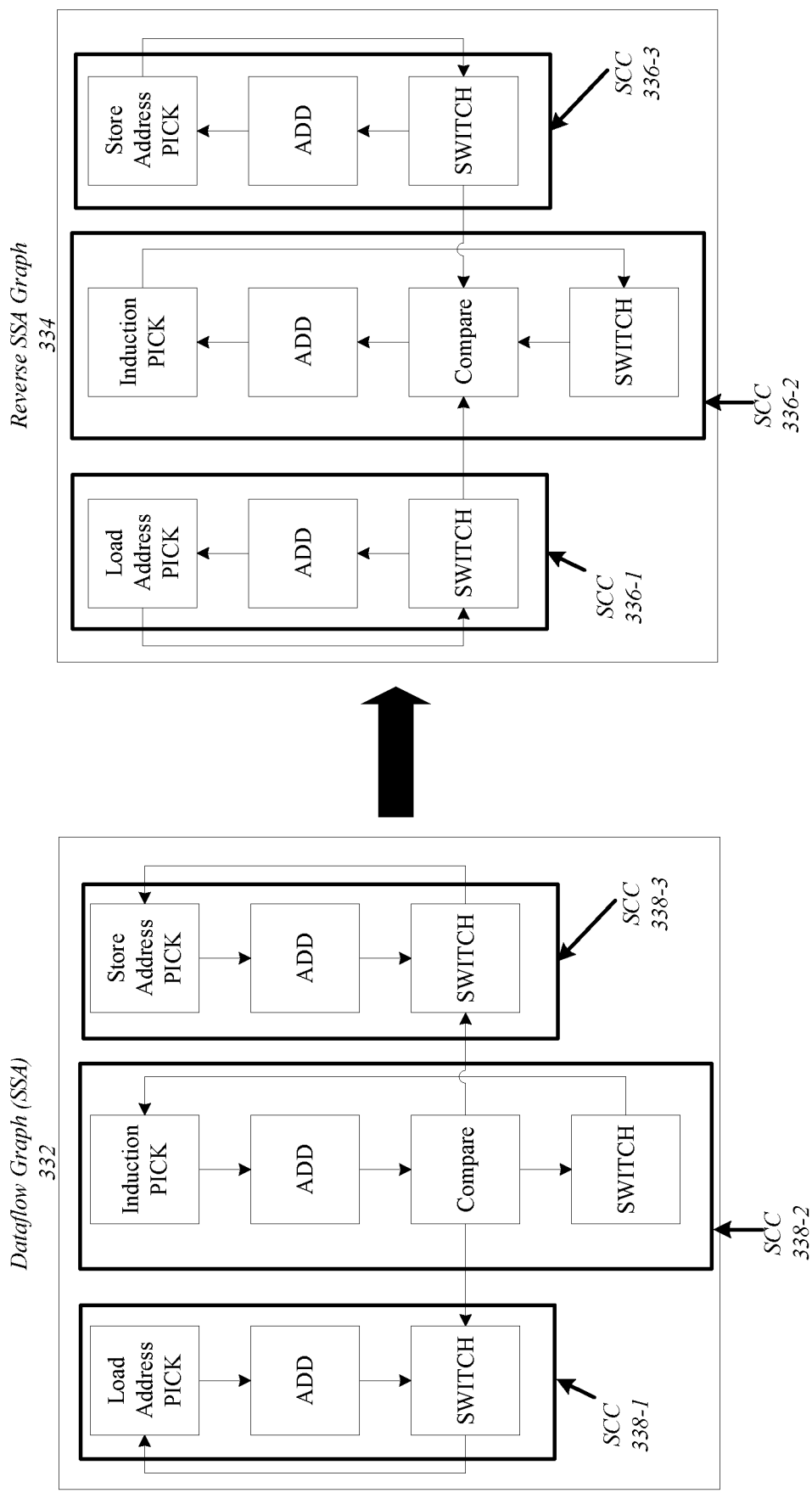
FIG. 3B illustrates an example of a processing flow diagram of a conversion from a dataflow graph to a reverse single static assignment (SSA) graph.

At block 302, a computing device may determine dataflow graph instructions on which to perform optimizations operations. The dataflow graph instructions may be generated from source code and control-flow graph instructions, as previously discussed above in FIGS. 2A/2B. At block 304, the computing device may determine or generate a dataflow graph, e.g., convert the dataflow graph instructions into graph form as illustrated in FIG. 3B, for example. The dataflow graph may represent data dependencies between operations, where the operations are represented by nodes and the data dependencies are represented by edges connecting the nodes. Moreover, the dataflow graph includes one or more SCCs where each of the nodes is reachable by every other node and may form a partition into subgraphs that are strongly connected. As illustrated in FIG. 3B, the dataflow graph 332 includes three SSCs 338-1 through 338-3 corresponding with the load instruction, the induction variable, and the store instruction, respectively. The dataflow graph may also be in static single assignment (SSA) form that is a property of the IR form requirement each variable is assigned exactly once and every variable is defined before it is used.

At block 306, the computing device may generate a reverse SSA graph (reverse dataflow graph) based on the dataflow graph. For example, the computing device may reverse direction (flow) of the edges of the dataflow graph connecting the nodes. In one example, as illustrated in FIG. 3B, the edges of the dataflow graph 332 are reversed to generate the reverse SSA graph 334. The reverse SSA graph 334 includes nodes connected by edges in a reverse flow direction and one or more SCCs. In FIG. 3B, the iteration constructs in the loop can be illustrated as SCCs 336-1 through 336-3 in the reverse SSA graph 334. Each of the SCCs 336 in the reverse SSA graph 334 may be associated with a pick/switch instruction pair. As illustrated, a first SCC 336-1 is associated with a pick/switch pair for the load address instruction, a second SCC 336-2 is associated with the pick/switch pair for the induction variable, and a third SCC 336-3 is associated with the pick/switch pair for the store address instruction. Note that embodiments are not limited to this example, other examples may include more or less SCCs and pick/switch pairs.

At block 308, the computing device may initiate performing a traversal of the reverse SSA graph. More specifically, the compiler may traverse the reverse SSA graph depth-first to search for SCCs associated with pick/switch instruction pairs using a depth-first algorithm, e.g., Tarjan's depth-first search algorithm.

At block 310, the computing device may determine and/or locate an SCC of the reverse SSA graph based on the traversal of using an algorithm. More specifically, the compiler may determine an SCC associated with a pick/switch instruction pair in the reverse SSA graph. As previously discussed, the compiler first determine the SCC associated with the induction variable based on the direction and edges of the reverse SSA graph when utilizing the depth-first traversal in linear time. Moreover, the reverse direction of the SSA graph ensures that the SCC associated induction variable is discovered first and SCCs associated with instructions have dependencies from the induction variable are discovered subsequent the discovery of the induction variable SCC. These subsequent SCCs may be discovered when the logic flow loop repeats at block 316, for example. Thus, if SCC_0 is associate with the induction variable and if SCC_i (where i any integer greater than 0) depends on SCC_0, SCC_0 will be discovered before SCC_i and SCC_0 can drive SCC_i. In other words, the output of the compound instruction of SCC_0 is used to generate the compound instructions for SCC_i.

At block 312, the computing device determines whether the SCC and associated pick/switch instruction pair includes configuration values. If the pick/switch instruction pair does not include configuration values, the computing device determines whether any SCC remain in the reverse SSA graph for analysis at block 316. If the pick/switch instruction pair includes configuration values, the compiler may replace the pick/switch instruction with a compound instruction in the dataflow graph instructions at block 314. The configuration values for the pick/switch instruction may be based on values specified in the reverse SSA (dataflow graph instructions) and associated SCC. In one example, the compiler 134 may determine an SCC associated with a pick/switch instruction pair for an induction variable includes configuration values, such as an initial value, a boundary value, and a stride. The compiler 134 may replace the pick/switch instruction pair associated with the induction variable with one or more compound instructions, such as sequence instructions.

In embodiments, the compiler may analyze the SCC associated with induction variable first based on the depth-first traversal. In some instances, the compiler may determine whether the induction variable and corresponding pick/switch instruction pair is affine or not affine, e.g., has or does not have a linear relationship between input and output. If the compiler determines the induction variable is affine, the compiler generates multiple compound instructions to replace pick/switch pairs, e.g., three compound instructions may replace pick/switch pairs for a copy loop instruction block as illustrated in code snippet 350 of FIG. 3C. However, if the compiler determines that the induction variable is not affine, the compiler replaces the pick/switch pairs with a single compound instruction to drive the sequence processing, e.g., drives a sequence reduction the summary and sequence stride for a memory address for a copy loop instruction as illustrated in code snippet 370 of FIG. 3D. Embodiments are not limited to these examples.

At block 316 the computing device determines if any SCCs remain for analysis. More specifically, the compiler continues to traverse the remainder of the reverse SSA graph. For example and with reference to FIG. 3B, the compiler may first analyze the SCC 336-2 associated with the induction variable and then the SCCs 336-1 and 336-3 associated with the load and store address instructions. If the compiler determines that one or more of the address instructions include configuration values, such as an initial value and a stride, the compiler replaces the address instruction's pick/switch pairs with compound instructions, e.g., sequence instructions to generate a sequence of addresses.

FIG. 4 illustrates an example of a logic flow 400 that may be representative of some or all of the operations executed by one or more embodiments described herein. For example, the logic flow 400 may illustrate operations performed by a system including a compiler, as described herein.

At block 405, the logic flow 400 includes determining dataflow graph instructions having one or more pick/switch instruction pairs. In embodiments, the pick/switch instruction pairs may be generated based on a compiler perform a conversion between control-flow graph instructions and dataflow graph instructions for branch and loop instruction sets. For example, the compiler may insert switches at the end of a loop to direct values out of a loop (either out of the loop exit or around the back-edge to the beginning of the loop), and insert picks at the beginning of the loop to choose between initial values entering the loop and values coming through the back edge. Moreover, each variable that conceptually cycles around the loop (i and sum) may have a corresponding pick/switch pair that controls the flow of the values. However, as previously mentioned, these pick/switch pair cycles are not optimized and may cause a bottleneck.

At block 410, the logic flow 400 includes generating a reverse static single assignment graph based on the dataflow graph instructions. In embodiments, the reverse static single assignment graph may include strongly connected components, and each of the strongly connected components is associated with at least one of the one or more pick/switch instruction pairs. The reverse static single assignment graph may be generated by reversing a dataflow graph based on the dataflow graph instructions, for example. The logic flow 400 includes traversing the reverse static single assignment graph depth-first, and replace pick/switch instructions associated with strongly connected components having configuration values with compound instructions at block 415.

Figure 5:
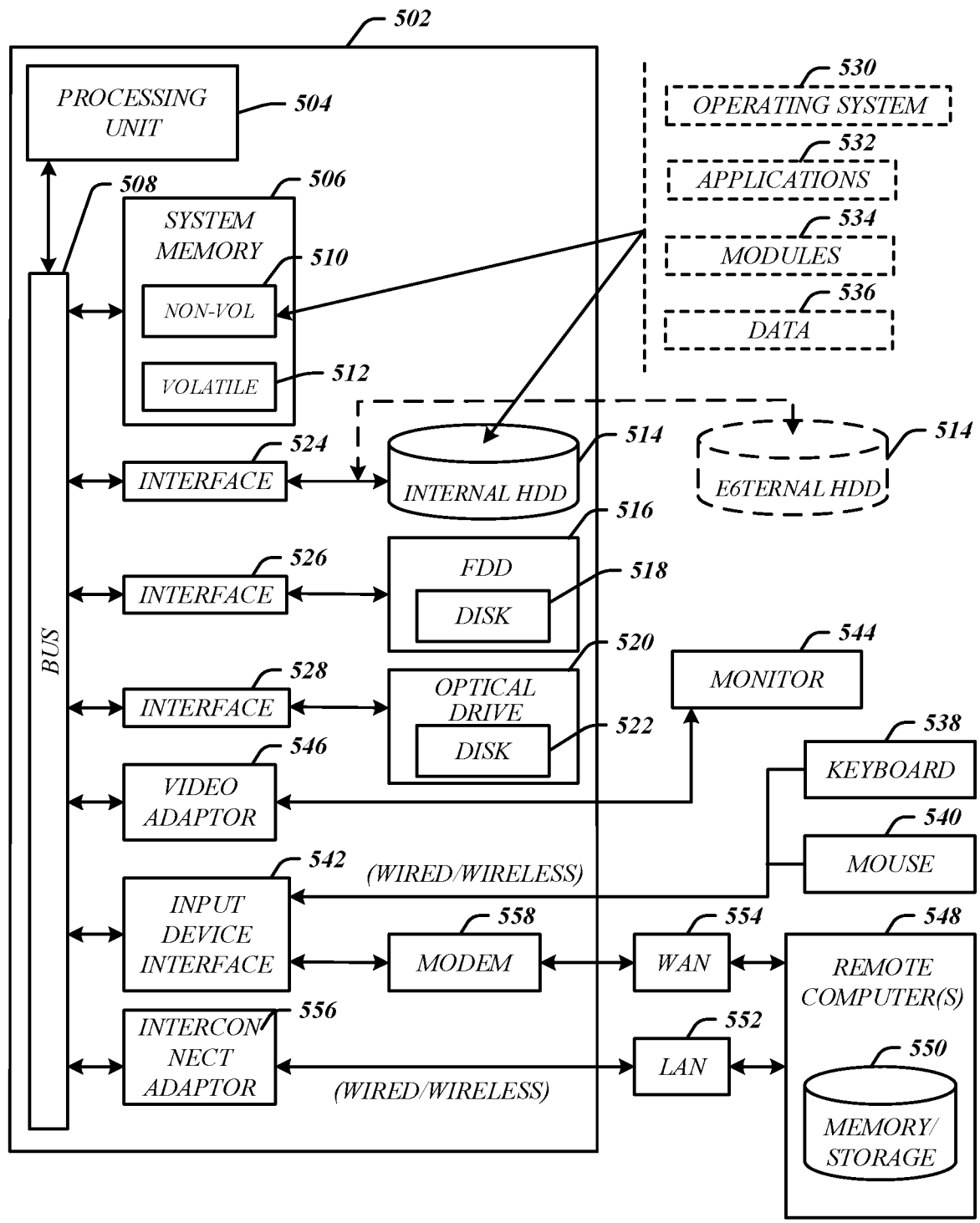
FIG. 5 illustrates an example embodiment of a computing architecture.

FIG. 5 illustrates an embodiment of an exemplary computing architecture 500 suitable for implementing various embodiments as previously described. In embodiments, the computing architecture 500 may include or be implemented as part of a node, for example.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 516, and an optical disk drive 520 to read from or write to a removable optical disk 522 (e.g., a CD-ROM or DVD). The HDD 514, FDD 516 and optical disk drive 520 can be connected to the system bus 508 by an HDD interface 524, an FDD interface 526 and an optical drive interface 526, respectively. The HDD interface 524 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and components of the device 100.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and larger networks, for example, a wide area network (WAN) 554. Such LAN and WAN networking environments are commonplace in offices and companies and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 502 family of standards, such as wireless devices operatively disposed in wireless communication (e.g., IEEE 502.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 502.116 (a, b, g, n, etc.) to provide secure, reliable, fast wireless connectivity. A Wi-Fi network can be used to connect computers to each other, to the Internet, and to wire networks (which use IEEE 502.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five provided below are intended to be exemplary and non-limiting.

In a first example, an apparatus, device, system, and so forth may include memory to store instructions, and processing circuitry coupled with the memory, the processing circuitry operable to execute the instructions, that when executed, enable processing circuitry to determine dataflow graph instructions including one or more pick/switch instruction pairs, generate a reverse static single assignment graph based on the dataflow graph instructions, the reverse static single assignment graph including strongly connected components, each of the strongly connected components associated with at least one of the one or more pick/switch instruction pairs, and traverse the reverse static single assignment graph depth-first, and replace pick/switch instructions associated with strongly connected components having configuration values with compound instructions.

In a second example and in furtherance of the first example, the apparatus, device, system, and so forth may include the processing circuitry to determine a strongly connected component associated with an induction variable has configuration values including an initial value, a boundary value, and a stride, and replace pick/switch instructions associated with the induction variable with one or more compound instructions.

In a third example and in furtherance of any of the proceeding examples, the apparatus, device, system, and so forth may include the processing circuitry to determine whether the induction variable is affine or linear, in response to the determination that the induction variable is affine, replace the pick/switch instructions associated with the induction variable with a plurality of compound instructions, and in response to the determination that the induction variable is linear, replace the pick/switch instructions associated with the induction variable with a single compound instruction to drive stride for one or more other instructions during execution.

In a fourth example and in furtherance of any of the proceeding examples, the apparatus, device, system, and so forth may include the processing circuitry to determine a strongly connected component associated with an address has configuration values including an initial value, and a stride, and replace pick/switch instructions associated with the address with one or more compound instructions.

In a fifth example and in furtherance of any of the proceeding examples, the apparatus, device, system, and so forth may include the processing circuitry to generate a dataflow graph for the dataflow graph instructions prior to generation of the reverse static single assignment graph, and generate the reverse static single assignment graph by reversing flow direction of edges of the dataflow graph.

In a sixth example and in furtherance of any of the proceeding examples, the apparatus, device, system, and so forth may include the processing circuitry to process a strongly connected component for an induction variable prior to processing strongly connected components for one or more address instructions when traversing the reverse static single assignment graph depth-first.

In a seventh example and in furtherance of any of the proceeding examples, the apparatus, device, system, and so forth may include the processing circuitry to wherein the dataflow graph instructions are based on one or more loop instructions in a high-level computer programming language.

In an eighth example and in furtherance of any of the proceeding examples, the apparatus, device, system, and so forth may include the processing circuitry to wherein each of the one or more compound instructions including one of a sequence instruction, a sequence reduction instruction, a repeat instruction, a sequence stride instruction, a nestrepeat instruction, a filter instruction, a replace instruction, and a replicate instruction.

In a ninth example and in furtherance of any of the proceeding examples, the apparatus, device, system, and so forth may include the processing circuitry to wherein the processing circuitry operable to execute the one or more instructions during a compilation operation for a configurable spatial accelerator to perform high-performance computing, the configurable spatial accelerator including an array of processing elements coupled by a network.

In a tenth example and in furtherance of any of the proceeding examples, a computer-implemented method to perform compiler optimizations may include determining dataflow graph instructions including one or more pick/switch instruction pairs, generating a reverse static single assignment graph based on the dataflow graph instructions, the reverse static single assignment graph including strongly connected components, each of the strongly connected components associated with at least one of the one or more pick/switch instruction pairs, and traversing the reverse static single assignment graph depth-first, and replace pick/switch instructions associated with strongly connected components having configuration values with compound instructions.

In an eleventh example and in furtherance of any of the proceeding examples, a computer-implemented method to perform compiler optimizations may include determining a strongly connected component associated with an induction variable has configuration values including an initial value, a boundary value, and a stride, and replacing pick/switch instructions associated with the induction variable with one or more compound instructions.

In a twelfth example and in furtherance of any of the proceeding examples, a computer-implemented method to perform compiler optimizations may include determining whether the induction variable is affine or linear. In response to the determination that the induction variable is affine, replacing the pick/switch instructions associated with the induction variable with a plurality of compound instructions, and in response to the determination that the induction variable is linear, replacing the pick/switch instructions associated with the induction variable with a single compound instruction to drive stride for one or more other instructions during execution.

In a thirteenth example and in furtherance of any of the proceeding examples, a computer-implemented method to perform compiler optimizations may include determining a strongly connected component associated with an address has configuration values including an initial value, and a stride, and replacing pick/switch instructions associated with the address with one or more compound instructions.

In a fourteenth example and in furtherance of any of the proceeding examples, a computer-implemented method to perform compiler optimizations may include generating a dataflow graph for the dataflow graph instructions prior to generation of the reverse static single assignment graph, and generating the reverse static single assignment graph by reversing flow direction of edges of the dataflow graph.

In a fifteenth example and in furtherance of any of the proceeding examples, a computer-implemented method to perform compiler optimizations may include processing a strongly connected component for an induction variable prior to processing strongly connected components for one or more address instructions when traversing the reverse static single assignment graph depth-first.

In a sixteenth example and in furtherance of any of the proceeding examples, a computer-implemented method to perform compiler optimizations may include processing each of the one or more compound instructions including one of a sequence instruction, a sequence reduction instruction, a repeat instruction, a sequence stride instruction, a nestrepeat instruction, a filter instruction, a replace instruction, and a replicate instruction.

In a seventeenth example and in furtherance of any of the proceeding examples, a computer-implemented method to perform compiler optimizations may include processing the dataflow graph instructions are based on one or more loop instructions in a high-level computer programming language.

In an eighteenth example and in furtherance of any of the proceeding examples, a non-transitory computer-readable storage medium, including a plurality of instructions, that when executed, enable processing circuitry to determine dataflow graph instructions including one or more pick/switch instruction pairs, generate a reverse static single assignment graph based on the dataflow graph instructions, the reverse static single assignment graph including strongly connected components, each of the strongly connected components associated with at least one of the one or more pick/switch instruction pairs, and traverse the reverse static single assignment graph depth-first, and replace pick/switch instructions associated with strongly connected components having configuration values with compound instructions.

In a nineteenth example and in furtherance of any of the proceeding examples, a non-transitory computer-readable storage medium, including a plurality of instructions, that when executed, enable processing circuitry to determine a strongly connected component associated with an induction variable has configuration values including an initial value, a boundary value, and a stride, and replace pick/switch instructions associated with the induction variable with one or more compound instructions.

In a twentieth example and in furtherance of any of the proceeding examples, a non-transitory computer-readable storage medium, including a plurality of instructions, that when executed, enable processing circuitry to determine whether the induction variable is affine or linear, in response to the determination that the induction variable is affine, replace the pick/switch instructions associated with the induction variable with a plurality of compound instructions, and in response to the determination that the induction variable is linear, replace the pick/switch instructions associated with the induction variable with a single compound instruction to drive stride for one or more other instructions during execution.

In a twenty-first example and in furtherance of any of the proceeding examples, a non-transitory computer-readable storage medium, including a plurality of instructions, that when executed, enable processing circuitry to determine a strongly connected component associated with an address has configuration values including an initial value, and a stride, and replace pick/switch instructions associated with the address with one or more compound instructions.

In a twenty-second example and in furtherance of any of the proceeding examples, a non-transitory computer-readable storage medium, including a plurality of instructions, that when executed, enable processing circuitry to generate a dataflow graph for the dataflow graph instructions prior to generation of the reverse static single assignment graph, and generate the reverse static single assignment graph by reversing flow direction of edges of the dataflow graph.

In a twenty-third example and in furtherance of any of the proceeding examples, a non-transitory computer-readable storage medium, including a plurality of instructions, that when executed, enable processing circuitry to process a strongly connected component for an induction variable prior to processing strongly connected components for one or more address instructions when traversing the reverse static single assignment graph depth-first.

In a twenty-fourth example and in furtherance of any of the proceeding examples, a non-transitory computer-readable storage medium, including a plurality of instructions, that when executed, enable processing circuitry to process the dataflow graph instructions based on one or more loop instructions in a high-level computer programming language.

In a twenty-fifth example and in furtherance of any of the proceeding examples, a non-transitory computer-readable storage medium, including a plurality of instructions, that when executed, enable processing circuitry to process each of the one or more compound instructions including one of a sequence instruction, a sequence reduction instruction, a repeat instruction, a sequence stride instruction, a nestrepeat instruction, a filter instruction, a replace instruction, and a replicate instruction.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory to store executable computer program instructions; and
   processing circuitry coupled with the memory, the processing circuitry operable to execute the instructions, that when executed, enable processing circuitry to:
   determine dataflow graph instructions comprising one or more pick and switch instruction pairs;
   generate a reverse static single assignment graph based on the dataflow graph instructions, the reverse static single assignment graph comprising strongly connected components, each of the strongly connected components associated with at least one of the one or more pick and switch instruction pairs; and
   traverse the reverse static single assignment graph depth-first, and replace pick and switch instructions associated with strongly connected components having configuration values with compound instructions.

2. The apparatus of claim 1, the processing circuitry to:
   determine a strongly connected component associated with an induction variable has configuration values comprising an initial value, a boundary value, and a stride; and
   replace pick and switch instructions associated with the induction variable with one or more compound instructions.

3. The apparatus claim 2, the processing circuitry to:
   determine whether the induction variable is affine or linear;
   in response to the determination that the induction variable is affine, replace the pick and switch instructions associated with the induction variable with a plurality of compound instructions; and
   in response to the determination that the induction variable is linear, replace the pick and switch instructions associated with the induction variable with a single compound instruction to drive stride for one or more other instructions during execution.

4. The apparatus of claim 1, the processing circuitry to:
   determine a strongly connected component associated with an address includes configuration values comprising an initial value, and a stride; and
   replace pick and switch instructions associated with the address with one or more compound instructions.

5. The apparatus of claim 1, the processing circuitry to:
   generate a dataflow graph for the dataflow graph instructions prior to generation of the reverse static single assignment graph; and
   generate the reverse static single assignment graph by reversing flow direction of edges of the dataflow graph.

6. The apparatus of claim 1, the processing circuitry to process a strongly connected component for an induction variable prior to processing strongly connected components for one or more address instructions when traversing the reverse static single assignment graph depth-first.

7. The apparatus of claim 1, wherein the dataflow graph instructions are converted from one or more loop instructions in a high-level computer programming language.

8. The apparatus of claim 1, wherein each of the one or more compound instructions comprising one of a sequence instruction, a sequence reduction instruction, a repeat instruction, a sequence stride instruction, a nestrepeat instruction, a filter instruction, a replace instruction, and a replicate instruction.

9. The apparatus of claim 1, wherein the processing circuitry operable to execute the one or more instructions during a compilation operation for a configurable spatial accelerator to perform high-performance computing, the configurable spatial accelerator comprising an array of processing elements coupled by a network.

10. A computer-implemented method, comprising:
    determining dataflow graph instructions comprising one or more pick and switch instruction pairs;
    generating a reverse static single assignment graph based on the dataflow graph instructions, the reverse static single assignment graph comprising strongly connected components, each of the strongly connected components associated with at least one of the one or more pick and switch instruction pairs; and traversing the reverse static single assignment graph depth-first, and replace pick and switch instructions associated with strongly connected components having configuration values with compound instructions.

11. The computer-implemented method of claim 10, comprising:
   determining a strongly connected component associated with an induction variable has configuration values comprising an initial value, a boundary value, and a stride; and
   replacing pick and switch instructions associated with the induction variable with one or more compound instructions.

12. The computer-implemented method of claim 11, comprising:
   determining whether the induction variable is affine or linear;
   in response to the determination that the induction variable is affine, replacing the pick and switch instructions associated with the induction variable with a plurality of compound instructions; and
   in response to the determination that the induction variable is linear, replacing the pick and switch instructions associated with the induction variable with a single compound instruction to drive stride for one or more other instructions during execution.

13. The computer-implemented method of claim 10, comprising:
   determining a strongly connected component associated with an address includes configuration values comprising an initial value, and a stride; and
   replacing pick and switch instructions associated with the address with one or more compound instructions.

14. The computer-implemented method of claim 10, comprising:
   generating a dataflow graph for the dataflow graph instructions prior to generation of the reverse static single assignment graph; and
   generating the reverse static single assignment graph by reversing flow direction of edges of the dataflow graph.

15. The computer-implemented method of claim 10, comprising processing a strongly connected component for an induction variable prior to processing strongly connected components for one or more address instructions when traversing the reverse static single assignment graph depth-first.

16. The computer-implemented method of claim 10, wherein each of the one or more compound instructions comprising one of a sequence instruction, a sequence reduction instruction, a repeat instruction, a sequence stride instruction, a nestrepeat instruction, a filter instruction, a replace instruction, and a replicate instruction.

17. The computer-implemented method of claim 10, wherein the dataflow graph instructions are converted from one or more loop instructions in a high-level computer programming language.

18. A non-transitory computer-readable storage medium, comprising a plurality of instructions, that when executed, enable processing circuitry to:
   determine dataflow graph instructions comprising one or more pick and switch instruction pairs;
   generate a reverse static single assignment graph based on the dataflow graph instructions, the reverse static single assignment graph comprising strongly connected components, each of the strongly connected components associated with at least one of the one or more pick and switch instruction pairs; and
   traverse the reverse static single assignment graph depth-first, and replace pick and switch instructions associated with strongly connected components having configuration values with compound instructions.

19. The non-transitory computer-readable storage medium of claim 18, comprising a plurality of instructions, that when executed, enable processing circuitry to:
   determine a strongly connected component associated with an induction variable has configuration values comprising an initial value, a boundary value, and a stride; and
   replace pick and switch instructions associated with the induction variable with one or more compound instructions.

20. The non-transitory computer-readable storage medium of claim 19, comprising a plurality of instructions, that when executed, enable processing circuitry to:
   determine whether the induction variable is affine or linear;
   in response to the determination that the induction variable is affine, replace the pick and switch instructions associated with the induction variable with a plurality of compound instructions; and
   in response to the determination that the induction variable is linear, replace the pick and switch instructions associated with the induction variable with a single compound instruction to drive stride for one or more other instructions during execution.

21. The non-transitory computer-readable storage medium of claim 18, comprising a plurality of instructions, that when executed, enable processing circuitry to:
   determine a strongly connected component associated with an address has configuration values comprising an initial value, and a stride; and
   replace pick and switch instructions associated with the address with one or more compound instructions.

22. The non-transitory computer-readable storage medium of claim 18, comprising a plurality of instructions, that when executed, enable processing circuitry to:
   generate a dataflow graph for the dataflow graph instructions prior to generation of the reverse static single assignment graph; and
   generate the reverse static single assignment graph by reversing flow direction of edges of the dataflow graph.

23. The non-transitory computer-readable storage medium of claim 18, comprising a plurality of instructions, that when executed, enable processing circuitry to process a strongly connected component for an induction variable prior to processing strongly connected components for one or more address instructions when traversing the reverse static single assignment graph depth-first.

24. The non-transitory computer-readable storage medium of claim 18, wherein the dataflow graph instructions are converted from one or more loop instructions in a high-level computer programming language.

25. The non-transitory computer-readable storage medium of claim 18, wherein each of the one or more compound instructions comprising one of a sequence instruction, a sequence reduction instruction, a repeat instruction, a sequence stride instruction, a nestrepeat instruction, a filter instruction, a replace instruction, and a replicate instruction.

* * * * *